United States Patent [19]

Woo et al.

[11] Patent Number: 4,811,381
[45] Date of Patent: Mar. 7, 1989

[54] DIRECT INWARD DIAL INTEGRATION APPARATUS

[75] Inventors: Donald E. Woo, Oakland; Paul M. Barnett, Sunnyvale, both of Calif.

[73] Assignee: Octel Communications Corporation, Milpitas, Calif.

[21] Appl. No.: 119,395

[22] Filed: Nov. 10, 1987

[51] Int. Cl.$^4$ .......................... H04M 3/50; H04M 7/14
[52] U.S. Cl. .......................................... 379/67; 379/84; 379/213; 379/233; 379/286
[58] Field of Search ...................... 379/84, 67, 88, 213, 379/233, 211, 286

[56] References Cited

U.S. PATENT DOCUMENTS

| | | | |
|---|---|---|---|
| 4,582,957 | 4/1986 | Hayes et al. | 379/79 |
| 4,629,831 | 12/1986 | Curtin et al. | 379/213 |
| 4,696,028 | 9/1987 | Morganstein et al. | 379/88 |

FOREIGN PATENT DOCUMENTS

| | | | |
|---|---|---|---|
| 0090664 | 7/1981 | Japan | 379/84 |
| 0161559 | 9/1983 | Japan | 379/88 |
| 0051055 | 3/1985 | Japan | 379/84 |
| 0144160 | 7/1986 | Japan | 379/88 |
| 0251264 | 11/1986 | Japan | 379/67 |

Primary Examiner—Thomas W. Brown
Attorney, Agent, or Firm—Flehr, Hohbach, Test, Albritton & Herbert

[57] ABSTRACT

A direct inward dial integration device is connected to the trunk side of a PBX in a business telephone system. The present invention permits a voice message system (VMS) to answer forwarded calls with a personal greeting of a called party. When a direct inward dial call is made, the identity of the extension (i.e., the extension number) being called is transmitted to the PBX by the telephone system. The integration device detects and stores the extension identity. If an incoming call is forwarded to the VMS, the VMS generates a query sigal, which causes the integration device to automatically transmit the stored extension number to the voice message system. Thus the voice message system can identify the called party. The VMS responds by answering the call with a personal greeting of the called party and inviting the outside caller to leave a recorded message.

11 Claims, 9 Drawing Sheets

DIRECT INWARD DIAL INTEGRATION APPARATUS

The present invention relates to business telephone systems, and more particularly to such systems utilizing a private branch exchange (PBX).

BACKGROUND OF THE INVENTION

Many business telephone systems support the interconnection of specialized auxiliary computer systems (such as, but not limited to, voice mail processing systems) to assist in the processing of telephone calls. The efficiency with which these auxiliary systems process calls would be enhanced if information about the calls (e.g., the telephone number dialed by the caller) were automatically sent to the auxiliary system prior to, concurrent with or following the presentation of the calls to the auxiliary system.

Auxiliary systems, such as voice mail systems, are also known as "applications processors".

Applications processors, such as voice mail systems, often act like one or more extensions in a private branch exchange (PBX). Calls terminate on the applications processor for several reasons, including (but not limited to) the following:

- Calls are placed directly to the applications processor.
- Calls are forwarded from an internal extension to the applications processor.
- Calls are forwarded from an internal extension to another extension and then to the applications processor.
- Calls are forwarded from a trunk group to the applications processor.

A call that is forwarded from an extension or trunk group to the applications processor may have been forwarded because of a busy condition, ring-no-answer condition or other condition (such as "do not disturb").

The applications processor may handle a call more efficiently if it knows why the call came to it. A mechanism which enables this information to be automatically passed to the applications processor greatly enhances the value of the applications processor and is the subject of the present invention.

BACKGROUND INFORMATION ON DIRECT INWARD DIAL PBX'S

The present invention is particularly useful in PBX systems which allow direct inward dialing. "Direct inward dialing" means that outside calls are automatically directed to a specified extension in the PBX. his is in contrast to PBX systems in which all calls are directed to a central switch board.

Typically, telephone numbers are seven digits long (excluding the area code), and a direct inward dial PBX (hereinafter called a DID PBX) is assigned all of the telephone numbers starting with a particular four digit prefix. While the number of digits in the prefix determines the maximum number of extensions in the PBX, this number is not particularly important for this discussion. In any case, for every PBX there is an assigned prefix. The remainder of the telephone number is herein called the "suffix", or the "PBX suffix", or the "extension number", and it identifies one extension in the PBX.

Note that when the PBX initiates a call the DID trunk lines are not used. In other words, two different sets of trunk lines are used for incoming and outgoing calls.

Another important fact regarding PBX's is that the PBX is connected to the central office (hereinafter called the CO) of the local telephone company by a number of trunk lines. Generally, there will be a multiplicity of trunk lines, but the number of extensions will far exceed the number of trunk lines.

When the CO routes a telephone call to the DID PBX, the CO connects the call to one of the PBX trunk lines and then transmits the suffix of the telephone number to the PBX. The PBX thereby receives the information necessary to automatically route calls to internal extensions without the intervention of an operator.

As mentioned above, many PBXs will forward calls from one extension to another when certain conditions occur (e.g., the called extension is busy, or there is no answer).

The primary problem addressed by the present invention is that when a PBX forwards a call, the PBX typically has no mechanism for informing the ultimate recipient of the call anything about how the call came to be routed to its ultimate extension. This is very inconvenient when the recipient of the call is a voice mail system, hereinafter called a VMS. The VMS does not know who you were trying to call—all it knows is that somehow it received a call. Thus, in these prior art systems, the voice mail system must ask the caller to redial the extension number of the person being called.

Not only is it inconvenient for the user to have to redial the extension of the person being called, such redialing is not available to rotary telephone users. Thus a rotary telephone user will be unable to effectively use the system.

SUMMARY OF THE INVENTION

In view of the foregoing, it is an object of the present invention to provide a direct inward dial integration apparatus for use in PBX systems.

The present invention is interconnected between a central office and a private branch exchange (PBX), and includes means for monitoring and storing the telephone extension number of each call coming into the PBX from the central office. If the call ultimately terminates in a voice message system or voice processing system, the present invention informs the voice message system of the extension number being called.

Since each extension number is typically assigned to a particular person or office, herein generically called a "party", the voice message system uses the extension number to identify the called party. The voice message system responds by answering the call with a personal greeting from the called party.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
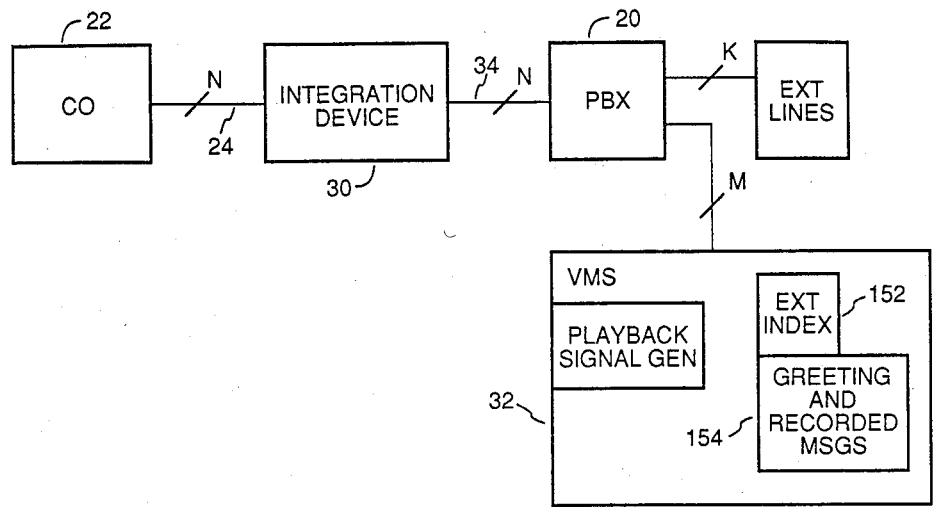
FIG. 1 is a block diagram of a private branch exchange telephone, system incorporating the present invention.

Referring to FIG. 1, a private branch exchange (PBX) 20 is connected to the local telephone company's central office (CO) 22 by N trunk lines 24, sometimes called Direct Inward Dial (DID) trunk lines. DID trunk lines 24 are used to pass the extension number of the called party to the PBX 20 whenever the CO 22 presents new calls to the PBX. Companies purchase this service from the telephone company so that callers can reach the intended parties without requiring the assistance of a PBX console operator.

Note that the terms trunk line, DID trunk line, and channel are all herein used to mean a direct inward dial trunk line.

The present invention is a device 30 that uses the communications between the CO and the PBX as the source of information for an applications processor—here a voice message system (VMS) 32. This device 30 is called an integration device because it integrates the automated function of a DID PBX with an applications processor.

The integration device 30 does not disturb any of the signaling protocols or transmissions that occur between the CO 22 and the PBX 20. Rather, it monitors these communications and stores in its memory the extension numbers that are transmitted by the CO 22 to the PBX 20. The present invention is able to repeat these digits to an applications processor, such as a VMS 32, upon demand.

When a new incoming call is presented to a business telephone system by a CO 22 using a DID trunk line 24, the following steps are executed to process the call.

(1) The CO 22 seizes an available DID trunk line 24 and provides a signal to the PBX 20 that alerts it to the presence of a new call. More specifically, the CO sets up a current loop, which has the effect of decreasing the voltage differential between the Tip and Ring lines in the trunk line 24.

(2) The PBX 20 will see that current is flowing through the trunk line, and it responds by preparing to receive an extension number. In some systems, the PBX signals the CO that it is ready by generating a "wink" signal, which is a voltage reversal on the trunk line for a short period of time (e.g., 200 milliseconds).

(3) The CO transmits the extension number of the called party, and the caller hears a ringing tone as the PBX 20 attempts to complete the call.

(4) If the call is answered, the PBX 20 signals the CO that the call has been answered by reversing the voltage on the trunk line.

As each new call is presented to the PBX 20, the integration device 30 stores the identity of the originally dialed extension number in a data structure such as the one shown in Table 1. As can be seen, the data structure is indexed by the channel number—i.e., the channel number is implied by the position of each extension number entry.

If the call is answered by a person, the integration device 30 takes no action on that connection. If the call is forwarded to the VMS 32, the VMS generates a playback signal— which is a short burst of a predefined tone, at 2350 Hz in the preferred embodiment. The playback signal, which is generated within six seconds of the connection to the VMS, informs the integration device 30 that information about the call is desired. The integration device 30 responds by temporarily excluding the caller from the connection while it transmits the extension number of the originally dialed party to the VMS 32. When it completes the transmission, it reconnects the caller to the VMS 32.

TABLE 1

| Channel | Channel/Extension Number Storage Data Structure — Extension Number Digits | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| 0 | 3 | 8 | 7 | 5 | | | | | | | | | | |
| 1 | 0 | | | | | | | | | | | | | |
| 2 | 3 | 2 | 3 | 4 | | | | | | | | | | |
| . | | | | | | | | | | | | | | |
| . | | | | | | | | | | | | | | |
| 7 | 3 | 2 | 3 | 9 | | | | | | | | | | |

The integration device 30 does not disturb any of the signaling that occurs between the CO 22 and the PBX 20. The CO 22 and PBX 20 handle all of the signaling required to establish and disengage calls. When the CO 22 passes digits to the PBX on incoming calls to tell the PBX to which extension an incoming call should be connected, the integration device 30 simply "listens" to this interaction and remembers the identity of the originally called party.

The integration device 30 makes it easier for outside callers who are forwarded to a Voice Message System to leave a message. Because the integration device automatically provides the VMS with the identity of the called party, outside callers are not required to reenter the extension number of the person they are calling. They simply wait for the end of the personal greeting, and then record a message. This capability is essential for callers with rotary telephones, since they are incapable of telling the VMS the identity of the called party.

The remainder of this specification provides a detailed description of the circuitry and methodology of the preferred embodiment.

Please note that, in order to facilitate the following discussion, "inverse" or "negative" logic signals in the preferred embodiment are herein described using "positive" logic. Thus signal $\overline{RD}$, which is "active when low", is herein denoted as signal RD, which is active when high.

Caller Isolation During Extension Number Playback

Transmission of the stored extension number typically takes about 0.2 seconds per digit, or a little less than one second for four digits. This transmission is performed using standard DTMF (i.e., touch tone) telephone signals. As noted above, the preferred embodiment isolates the caller from the playback of the extension number. The purpose of this feature is to avoid subjecting the caller to the playback sequence. Also, the isolation feature prevents noise and other signals on the trunk lines 24 from interfering with and corrupting the transmission of the extension number transmission by the integration device 30 to the VMS 32. It is for this reason that the integration device 30 in FIG. 1 is placed between the CO 22 and the PBX 20.

In FIG. 1, the DID trunk lines 24 are coupled by the integration device 30 to corresponding DID connectors 34, which are coupled to corresponding ports in the PBX 20. In systems without an integration device, the DID trunk lines 24 are directly wired to the DID connectors 34 (or to the PBX's trunk line ports).

Figure 2:
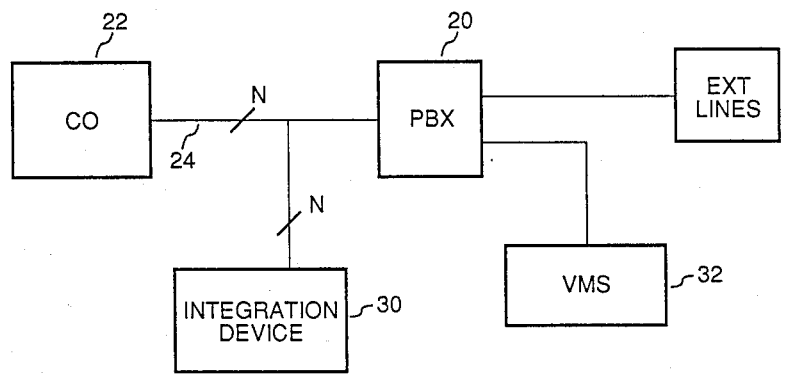
FIG. 2 is a block diagram of an alternate system configuration incorporating the present invention.

Since the caller isolation feature is not a necessary part of the invention, in alternate embodiments of the invention the integration device need not include this feature. In such systems, the system configuration will be as shown in FIG. 2.

System Configuration

Figure 3:
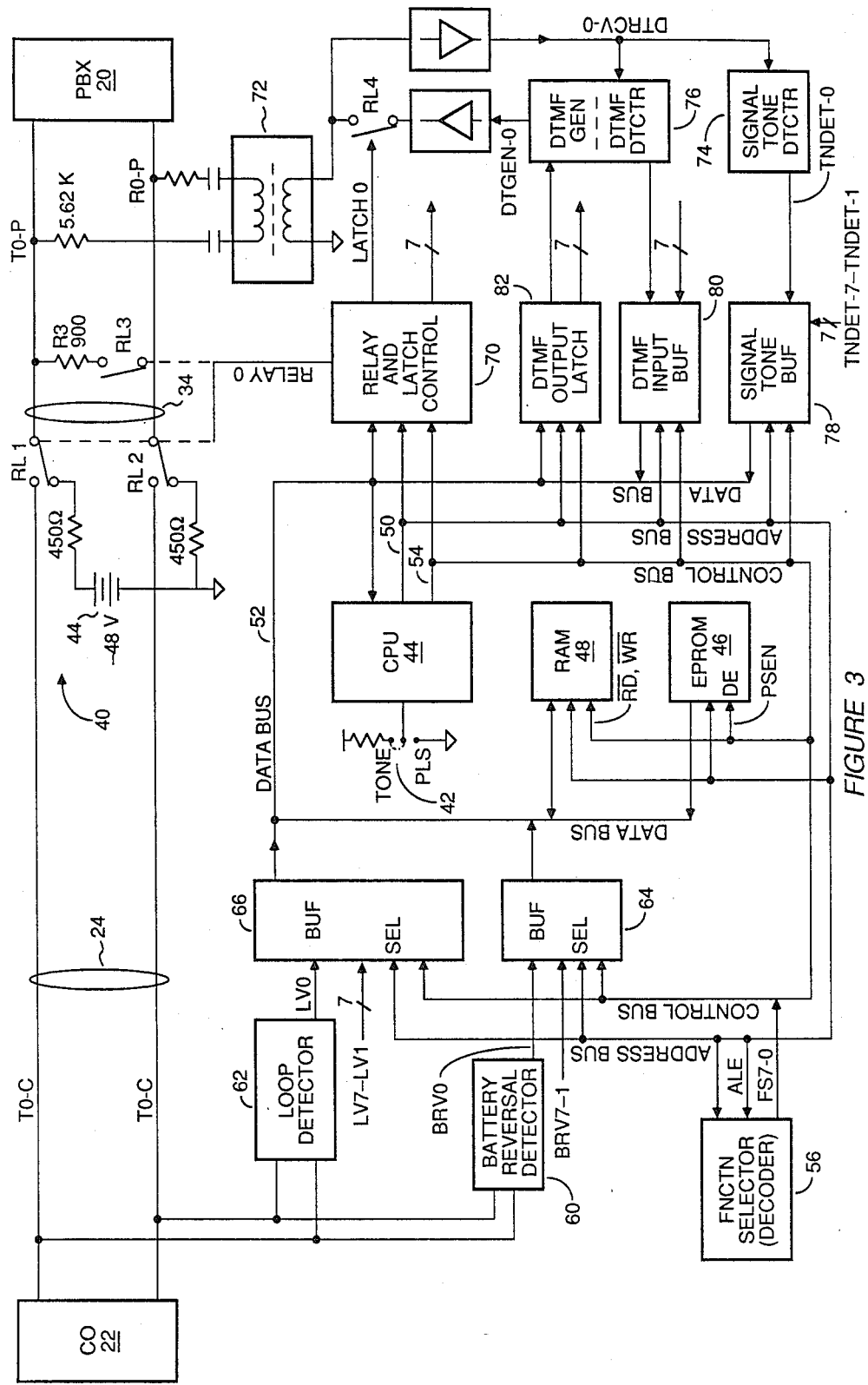
FIG. 3 is a block diagram of a DID PBX integration device in accordance with the present invention.

FIG. 3 is a block diagram of an integration device 30 for monitoring eight DID trunk lines. Only one DID trunk line 24 is shown so that the isolation circuitry 40 and the circuitry for monitoring the trunk line and for transmitting extension numbers can be shown.

Each of the eight trunk lines monitored by the integration device 30 is handled in the same way—even though only one is shown in FIG. 3. Many of the signals used in the integration device 30 are repeated eight times, and these signals are indexed with a number between 0 and 7 to indicate the corresponding trunk line. As shown, each trunk line 24 has two lines called the Tip and Ring lines, labelled T0-C and R0-C. The "0" indicates that these lines belong to trunk line and the "C" indicates that these lines are on the Central Office side of the isolation circuitry 40.

On the PBX side of the isolation circuitry 40, the trunk line 40 is called the trunk connector 34. The Tip and Ring lines here are labelled T0-P and R0-P, where the "P" indicates that these lines are on the PBX side of the isolation circuitry.

The integration device 30 is a computerized system which uses a microcontroller 44 (a model 8031 microcontroller made by Intel in the preferred embodiment) as its central processing unit (CPU). An EPROM 46 (erasable programmable read only memory) stores the CPU's control programs, and a random access memory (RAM) 48 is used as a scratch pad memory.

Using standard microcontroller architecture, the CPU 44 communicates with the rest of the system using a set of system busses: an Address Bus 50, a Data Bus 52, and a Control Bus 54. The Address Bus 50 comprises fifteen parallel lines A14–A0, and the Data Bus comprises eight parallel lines D7–D0. The EPROM 46 is a 16k×8 memory that is addressed by address lines A13–A0, and outputs data (or software) only when control signal PSEN is active. The RAM 48 is a 2k×8 memory addressed by A10–A0, and is active only when A14 is inactive. Reading and writing to the RAM 48 is performed using standard read (RD) and write (WR) control signals.

The Control Bus 54 carries signals generated by the CPU 44, and also a set of function selection signals FS7–FS0 that are generated by a decoder 56. In particular, the decoder 56 decodes address lines A5–A3 when address line A14 is active.

Trunk Line Voltage Detectors. The status of each trunk line 24 is monitored by two devices: a battery reversal detector 60 and a loop detector 62. Both devices draw virtually no current from the trunk line, and use optical isolators to decouple the system 30 from the trunk line 24.

When the CO 22 connects an incoming call to trunk line 24, the trunk line's status changes from "On Hook" to "Off Hook". The PBX detects this by detecting current flowing on the trunk line 24. The integration device 30 is not in the trunk line's current loop—so it cannot directly detect current flow. Instead, the integration device detects a change in the line voltage on the trunk line.

Some systems use a "wink" procedure, in which the CO 22 does not send an extension number until the PBX 20 winks at the CO by performing a brief (e.g., 200 millisecond) battery reversal. The "wink" indicates to the CO 22 that the PBX 20 is ready to receive an extension number. In other systems, the CO 22 transmits the extension number immediately (e.g., 100 milliseconds) after establishing an Off Hook line condition.

After the CO 22 sends the extension number to the PBX 20, if the call is answered, the PBX 20 responds by performing a "battery reversal"—which reverses the voltage on the Tip and Ring lines (T0-P and R0-P in FIG. 3) as compared to the line voltage while the extension number is being sent by CO 22 and when the called number is ringing.

The battery reversal detector 60 generates a signal called BRVx which indicates whether trunk line x is currently "battery reversed" or not.

In some systems, the extension number will be transmitted by the CO 22 using DTMF signals, and in other systems the CO 22 will use pulse coding. The preferred embodiment includes a jumper 42 for specifying the type of signals being used by the CO 22 connected to the integration device 30.

The loop detector 62 is actually a voltage signal level detector—not a current loop detector—but it is meant to simulate the current loop detection function of the PBX 20. The trunk line's line voltage is monitored by the integration device for two purposes: detecting whether the line is on or Off Hook, and for decoding extension numbers when pulse coded extension numbers are transmitted by the CO 22 to the PBX 20.

Thus the purpose of the loop detector 62 is to monitor voltage levels on the trunk line 24 for On/Off Hook detection and for decoding pulse coded extension numbers. The method of decoding these voltage levels on the trunk line into extension numbers is explained below in the section entitled "Pulsed Digit Decoding".

Note that the loop detector 62 is used for On/Off Hook detection even if the CO 22 transmits extension numbers using DTMF signals. Each CO 22 uses only DTMF or only pulsed coding, and the type of coding used is indicated by jumper 42.

The voltage level generated by the loop detector 62 is converted into an eight bit binary value, labelled LVx for trunk Line Voltage x.

Buffers 64 and 66 control transmission of the battery reversal and line voltage signals onto the Data Bus 52

Caller Isolation Circuit. The caller isolation circuit 40 includes three two-pole relays RL1, RL2 and RL3. RL1 and RL2 are normally closed, and RL3 is normally open. When the integration device 30 is ready to transmit an extension number to the VMS 32, the caller is isolated as follows. RL1 and RL2 are opened, and RL3 is closed by a relay signal RelayX (where X identifies the trunk line). The RL1 and RL2 relays, when opened, connect the Tip and Ring lines TX-P and RX-P to a −48 volt voltage source 44—which mimics the battery reversal normally maintained by the PBX while a call is in progress. The RL3 relay, when closed, couples the DID connectors lines TX-P and RX-P together through resistor R3—which mimics the trunk line condition maintained by the Central Office 22 while a call is in progress.

When the device has completed transmission of the extension number, the relays RL1, RL2 and RL3 are returned to their normal conditions—thereby reestablishing contact between the caller (i.e., the CO 22) and the PBX 20. Thus the integration device simulates the maintenance of a normal connection between the DID trunk line and the PBX even when the two are disconnected.

Two sets of signals called Relay7-Relay0 and Latch7-Latch0 are generated using Control circuit 70. The Relay signals control the caller isolation circuits 40 for each trunk line 24. The Latch signals each control a solid state switch, labelled RL4, which enables DTMF transmission by the integration device onto the corresponding trunk line 24.

Signal Tone Detector and DTMF Transceiver. DTMF signals, and the VMS playback signal are transmitted to and from the trunk lines through a transformer 72. Playback signals from the VMS are detected by Signal Tone Detector 74.

The Signal Tone Detector 74 is a narrow band signal detector that generates signals TNDET-x that are enabled only when a VMS playback signal is detected on the corresponding trunk line. In the preferred embodiment, the playback signal is a tone at 2350 Hz which has a duration of about 0.20 seconds. In other words, the VMS is programmed to generate this tone whenever it receives a call.

The signal tone detection software, discussed below, requires that the playback signal have a duration of at least 0.15 seconds before it will be considered to be a valid playback signal. This requirement prevents line noise, voice signals, and other normal line signals from being interpreted as a playback signal. Clearly, in other embodiments of the invention, other playback signals could be used so long as they are designed not to be easily confused with any of the wide range of signals normally encountered on telephone lines. DTMF coded extension numbers from the CO are detected and decoded by DTMF transceiver 76. DTMF transceiver 76 is also used to transmit DTMF coded extension numbers to the VMS 32 via the trunk line connector 34.

Input Buffers 78 and 80 control the reading of playback signals and DTMF coded extension numbers by the CPU 44. DTMF Output Latch 82 holds extension numbers to be transmitted by the DTMF transceiver 76.

Trunk Line Voltage Detectors

Figure 4:
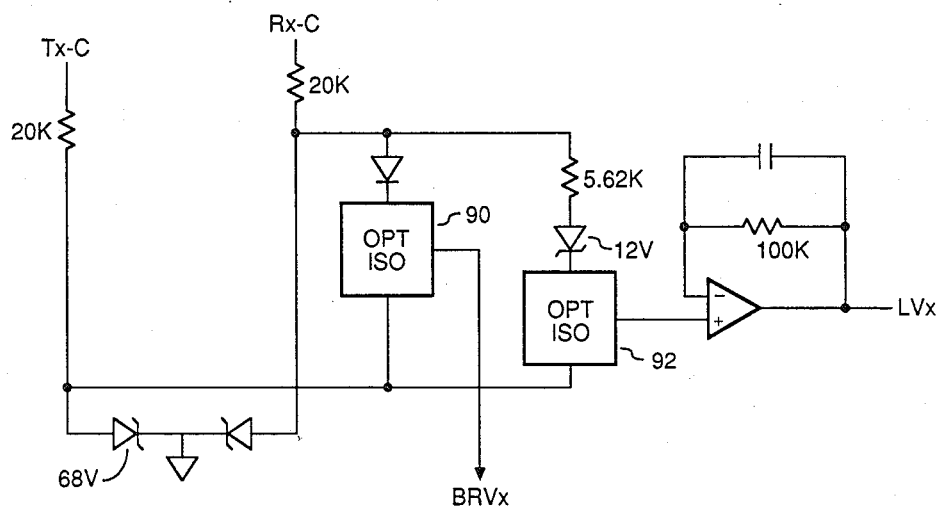
FIG. 4 is a circuit schematic for detecting battery reversal and for detecting trunk line voltage for use when decoding rotary/pulsed dialed extension numbers.

Referring to FIG. 4, there is shown the circuit for generating the Battery Reversal signals BRVx and Line Voltage signals LVx. When the Ring line Rx-C voltage exceeds the Tip line Px-C voltage, the trunk line is battery reversed and the BRVx signal is active.

When the trunk line is not battery reversed, and the line voltage is at least fifteen volts (i.e., the Tip line Px-C voltage exceeds the Ring line Rx-C voltage by at least fifteen volts), a nonzero Line Voltage signal LVx is generated. Thus signal LVx is linearly proportional to the trunk line voltage, but only when the line voltage is at least fifteen volts.

LVx and BRVx are generated by optical isolators 90 and 92 so that the integration device will not disturb the operation of the trunk line 24.

Non-DTMF Functions

Figure 5:
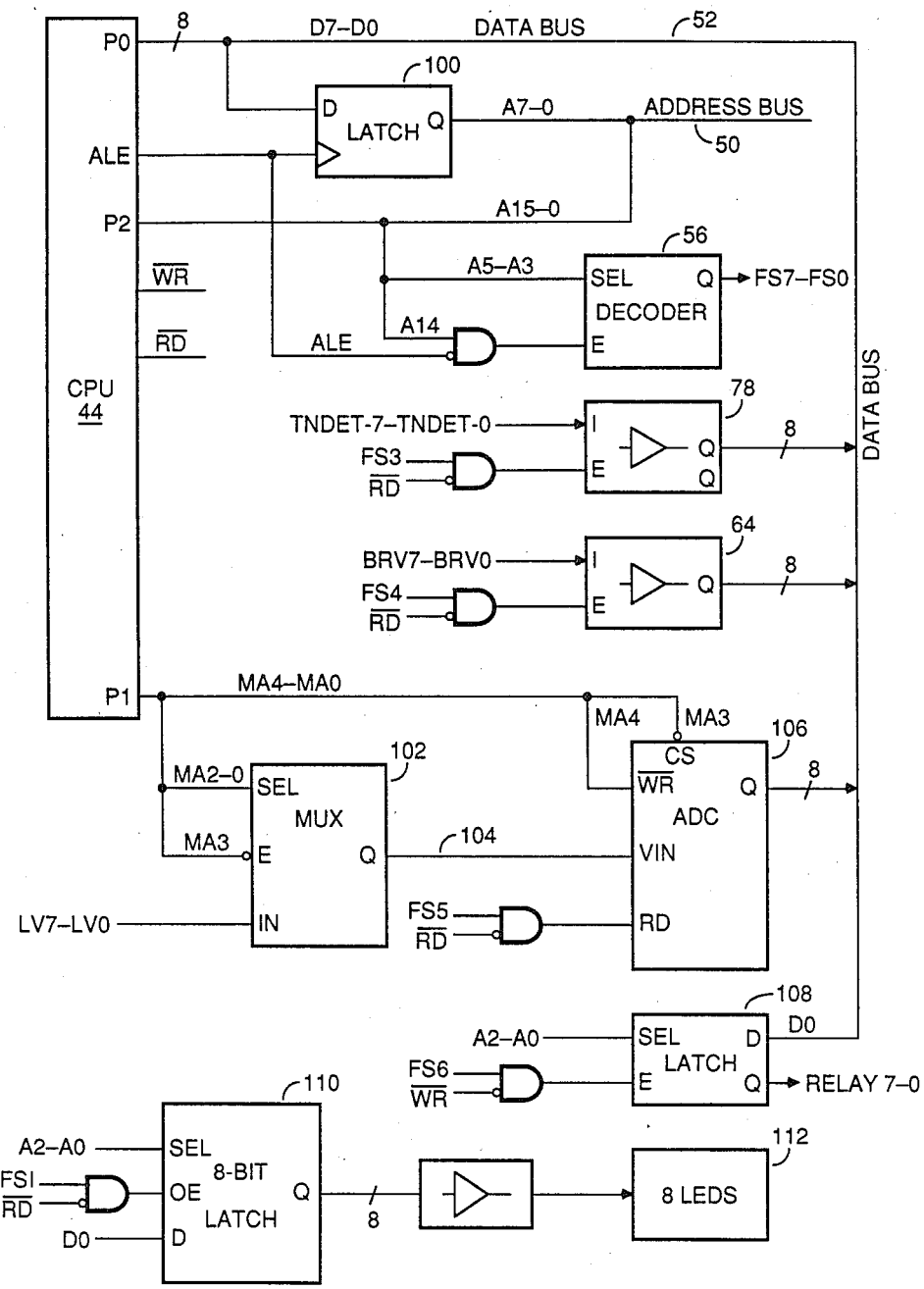
FIGS. 5 and 6 are detailed schematics of the preferred embodiment of the invention, with FIG. 5 showing the basic computer circuitry, and FIG. 6 showing the circuitry for decoding incoming touch tone extension numbers and for transmitting touch tone extension numbers to an applications processor.
Figure 6:
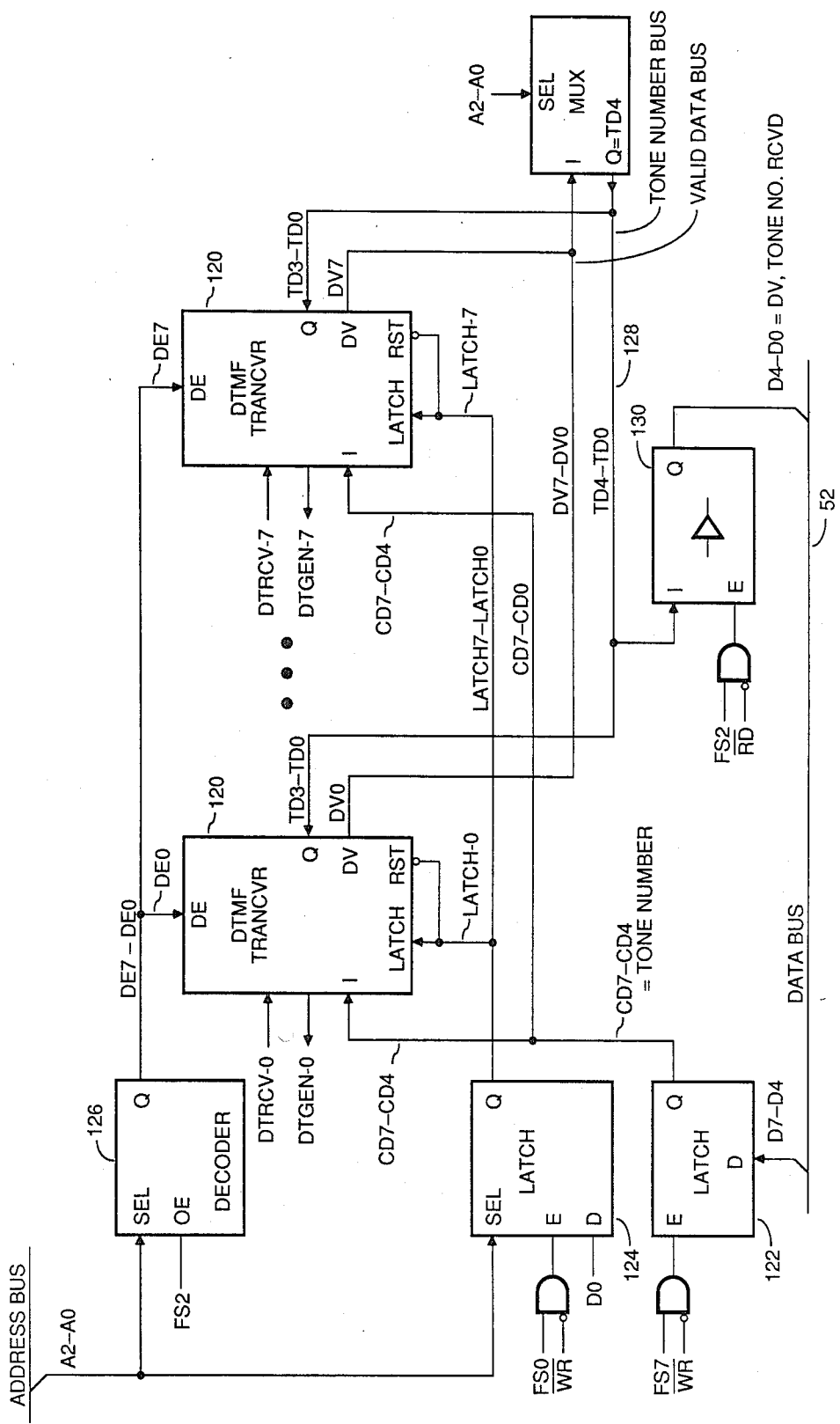

Referring to FIG. 5, there is shown a more detailed schematic of the preferred embodiment, excluding the circuitry for handling DTMF signals—which is shown in FIG. 6.

As shown, port P0 of the CPU is used for both for the Data Bus 52, and for the lower eight bits A7-A0 of the Address Bus 50. Latch 100 latches the lower eight bits of the Address Bus 50 when control signal ALE (address low enable) is activated.

Function decoder 56 decodes address lines A5-A3 into function signals FS7-FS0 when address line A14 is active and control signal ALE is inactive (indicating that the low order address signals are stable). Thus address line A14 acts as an enabling signal for function decoder 56.

Table 2 lists the functions associated with the eight function select signals.

TABLE 2

| Function Signal | Corresponding Function |
|---|---|
| FS0 | Latch incoming DTMF signal |
| FS1 | Set Up selected LED |
| FS2 | Read incoming DTMF tone number |
| FS3 | Read tone detection signals TNDET7-0 |
| FS4 | Read battery reversal signals BRV7-0 |
| FS5 | Read selected trunk line voltage LVx |
| FS6 | Latch relay signals Relay7-0 |
| FS7 | Transfer tone number from Data Bus to DTMF transceiver for transmission onto selected trunk line |

The eight tone detection signals TNDET7-TNDET0 are read by the CPU by activating the read signal RD and function signal FS3—which enables buffer 78 and thereby places the signals on the Data Bus 52.

The eight battery reversal signals BRV7-BRV0 are read by activating RD and FS4—which enables buffer 64 and thereby places the signals on the Data Bus 52.

The trunk line voltage of a selected trunk is read as follows. Signals MA4-MA0 on CPU port P1 act as control signals, with MA2-MA0 being used to select one of the eight trunk lines 24. Setting MA3=0 enables analog MUX 102, which results in a selected one of the eight analog voltage signals LV7-LV0 being placed on line 104.

The selected line voltage is converted into an eight bit digital (i.e., binary) value by an analog to digital converter ADC 106. Setting MA4=1 enables the ADC to convert the signal on line 104. To read the converted value, FS5 and RD must be enabled to allow the converted value to be transmitted onto the Data Bus 52.

Eight bit Latch 108 sets up relay control signals Relay7-Relay0 by latching the value on Data Bus line D0 into one of eight latches, selected in accordance with A2-A0, when function signal FS6 and write signal WR are enabled.

Eight bit Latch 110 sets up eight LEDs 112 by latching the value on Data Bus line D0 into one of eight latches, selected in accordance with A2-A0, when function signal FS1 and write signal WR are enabled.

DTMF Functions

Referring to FIG. 6, there is shown a more detailed schematic of the preferred circuitry for handling DTMF signals. For each trunk line there is one DTMF transceiver circuit 120. These circuits both decode incoming DTMF tones, here labelled DTRCV-x, and generate specified DTMF tones, here labelled DTGEN-x.

Tone Generation. Tone generation, for sending extension numbers to the VMS 32, works as follows. The tone number to be transmitted is written from data bus lines D7-D4 into latch 122 when FS7 and WR are enabled. The latched tone is labelled CD7-CD4 in FIG. 6.

The latched tone number is written into a selected one of the DTMF transceivers by enabling one of the Latch signals. The Latch7-Latch0 signals are generated by latch 124, which latches the value of Data Bus signal D0 into one of eight latches selected by signals A2-A0 when FS0 and WR are enabled.

The selected DTMF transceiver generates the specified tone on line DTGEN-x until the corresponding Latch signal becomes inactive, which resets the generator portion of the transceiver.

Since only one of the Latch7-Latch0 signals can change value at any one time, only one of the DTMF transceivers can be started or stopped at any one time. However, any number of the DTMF transceivers can simultaneously output tones. Furthermore, since all of the Latch and CD7-CD4 signals are under software control, the eight DTMF transceivers 120 can be used to transmit tones virtually simultaneously.

Note that each Latch signal also closes the corresponding solid state switch RL4 in FIG. 3, which allows the generated tone DTGEN-x to be transmitted onto the trunk line (i.e., the trunk line connector 34).

Tone Decoding. Received DTMF signals, which are encoded extension numbers transmitted by the CO 22, are decoded as follows.

The DTMF transceivers are polled one at a time to determine if the CO 22 is sending an extension number to the PBX 20. The polling is performed y enabling one of the DEx (decode enable) signals at a time. Decoder 126 decodes address signals A2-A0 when FS2 is active, and thereby selects and enables one of the eight signals DE7-DE0.

When a decode enables signal DEx is active, the corresponding transceiver 120 generates two signals: DVx and TD3-TD0. DVx (which stands for Data Valid) is active only if a valid DTMF tone is found on the corresponding trunk line. The identity of the DTMF tone is given by TD3-TD0.

The TD3-TD0 outputs from all of the DTMF transceivers are wired together—only the selected transceiver asserts data onto the Tone Number Bus 128. The DVx signals, however, cannot be wired together. Therefore the DVx signal from the transceiver being polled is selected using multiplexer 130. The selected DVx signal is labelled TD4.

Signals TD4-TD0 are read when FS2 and RD are active, enabling buffer 130 to transmit these signals onto the Data Bus 52.

Method of Use

Figure 7:
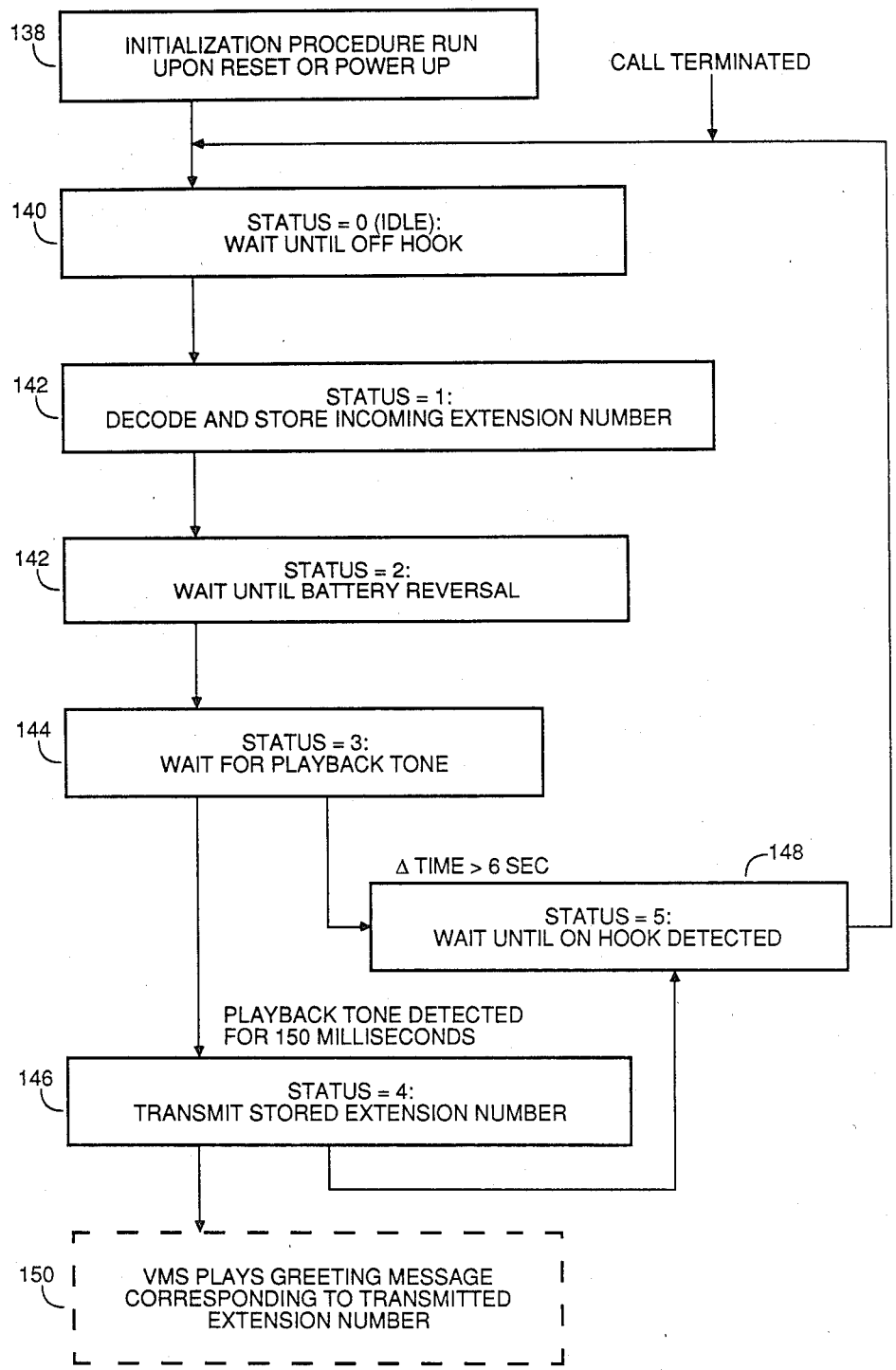
FIG. 7 is a flow chart of the process performed for each trunk line.

Referring to FIG. 7, the method of invention as applied to one trunk line is as follows. Note that, for convenience, the status of each trunk line x is denoted with a variable called STATUSx having values as shown in Table 3.

After the system is initialized 138 (upon power on or system reset), or after the completion of a previous call, the system waits until an Off Hook condition is detected (box 140).

TABLE 3

| STATUS Value | Description |
| --- | --- |
| 0 | Idle - On Hook |
| 1 | Extension number being decoded |
| 2 | Waiting for battery reversal |
| 3 | Waiting for playback tone |
| 4 | Sending extension number |
| 5 | Waiting for call to terminate |

When an Off Hook condition occurs, the integration device decodes and stores the extension number as it is transmitted (box 141). Note that decoding the extension number uses the DTMF transceiver if the Central Office 22 uses DTMF signaling, and otherwise uses the Loop Detector circuitry 62 to decode pulse coded extension numbers.

The third step (box 142) in processing a new call is to wait for a battery reversal, which indicates that the call was answered.

Next (box 144) the system waits for a playback tone from the Voice Message System 32. If a playback tone is received, the next step is to transmit the stored extension number to the VMS 22 (box 146). The VMS 22 responds by playing a greeting message corresponding to the extension number (box 150).

Note that in FIG. 1, there is shown a message index data structure 152. The message index 152 contains pointers for each extension number to the corresponding locations in the VMS's recorded message memory 154 for both greeting messages and recorded messages being stored for that extension. Unused extensions (e.g., extension numbers with no corresponding phone) can be programmed to cause the call to be forwarded to an operator, or can be mapped into single pool of messages. In the preferred embodiment, the recorded message memory 154 comprises a number of hard disk storage units.

Referring again to FIG. 7, if no playback tone is received within a reasonable period of time (six seconds in the preferred embodiment), the integration device goes into an idle state until the call is terminated (box 148).

After sending the extension number, the integration device waits for the call to be terminated (box 148), and then the process resumes at the first step (box 140).

Figure 8:
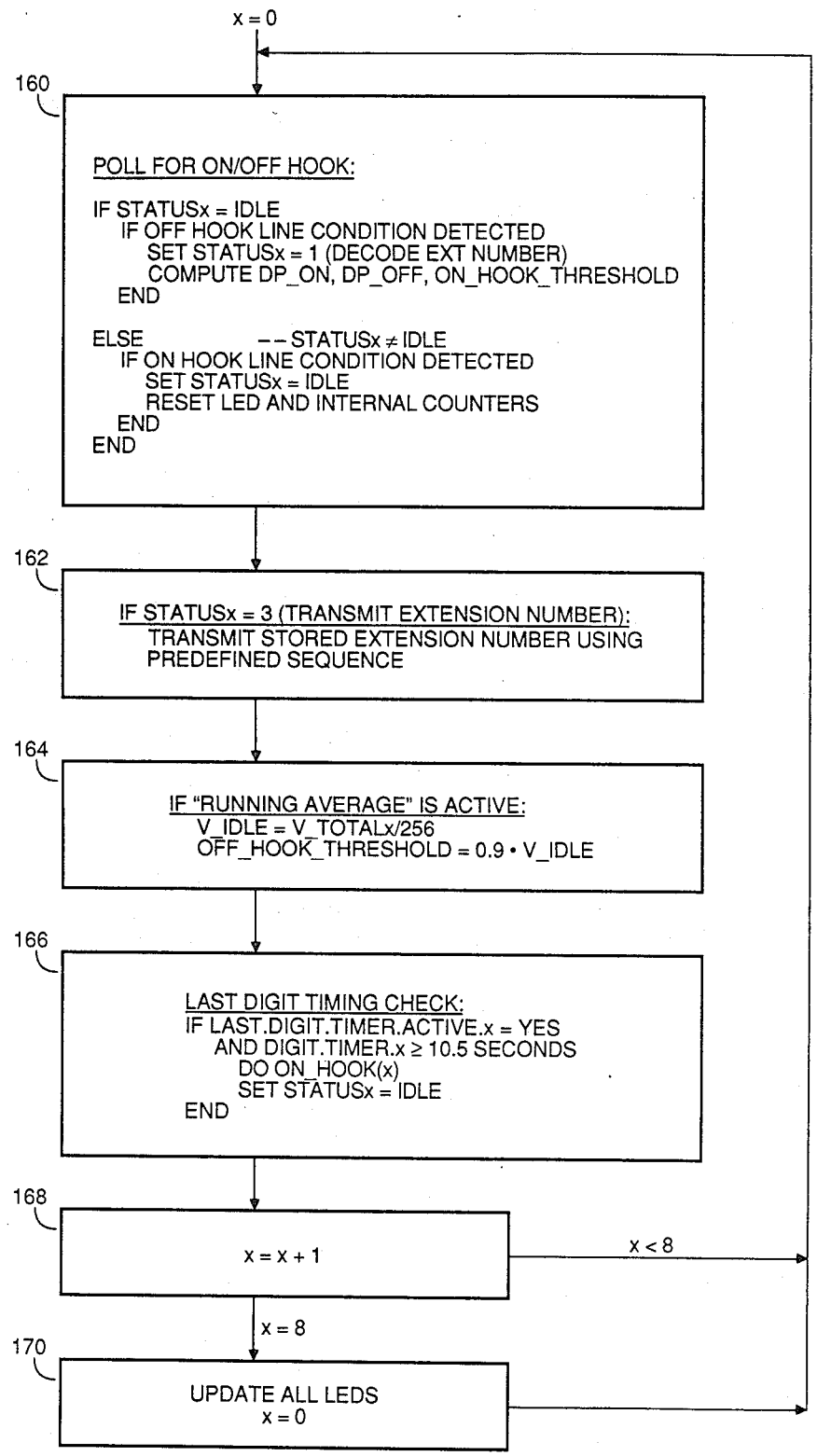
FIG. 8 is a flow chart of the background software routine in the preferred embodiment.
Figure 9:
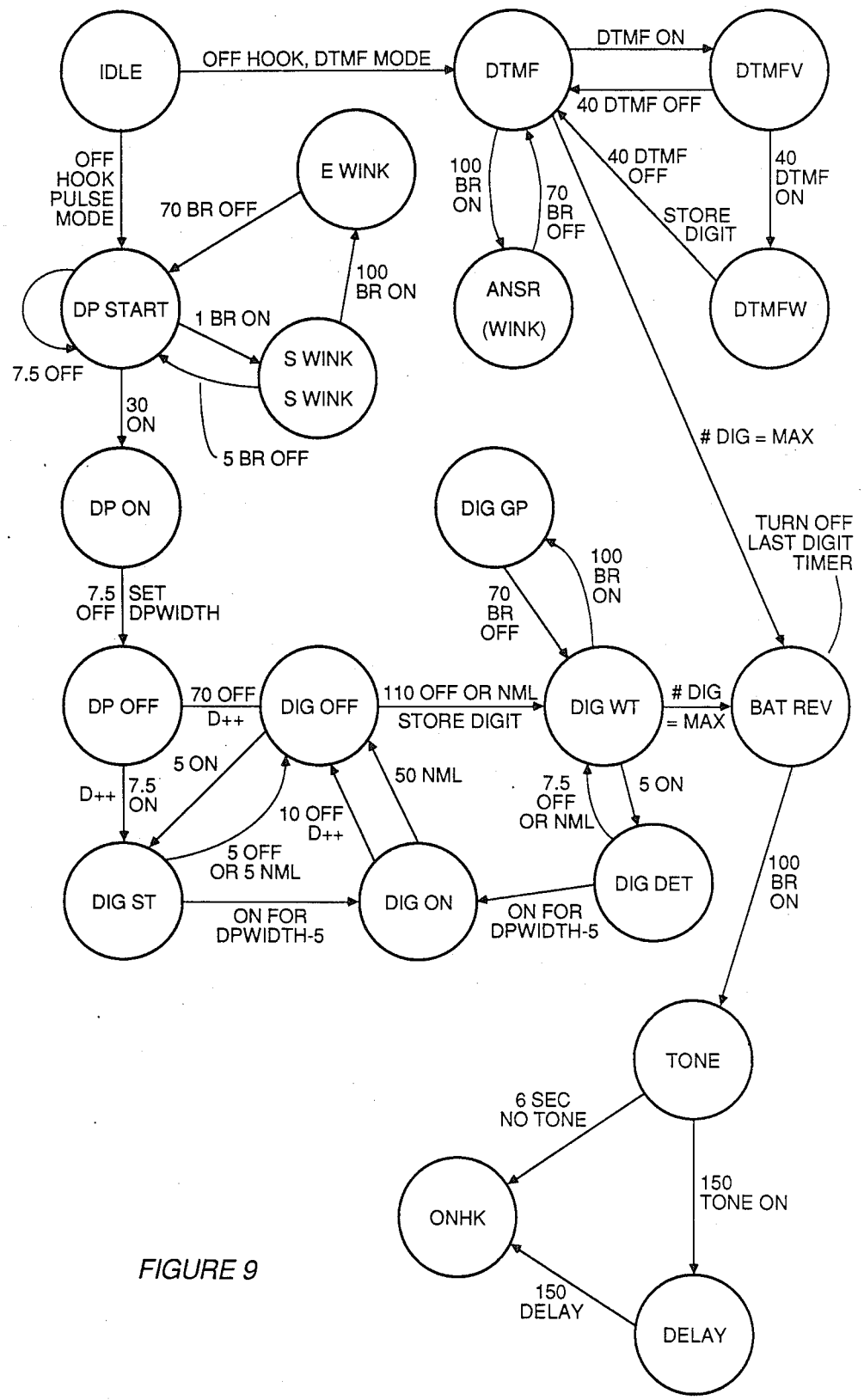
FIG. 9 is state diagram for a periodic interrupt software routine in the preferred embodiment.

Software Implementation Referring to FIGS. 8 and 9, and Appendices 1 and 2, the software for running the integration device in the preferred embodiment is divided into two main components: a background loop (FIG. 8) which runs continuously (i.e., asynchronously), and an interrupt program (FIG. 9) which is called once every 2.5 milliseconds. Note that the numerical time units in FIG. 9 are in milliseconds, except where otherwise indicated.

Figure 10:
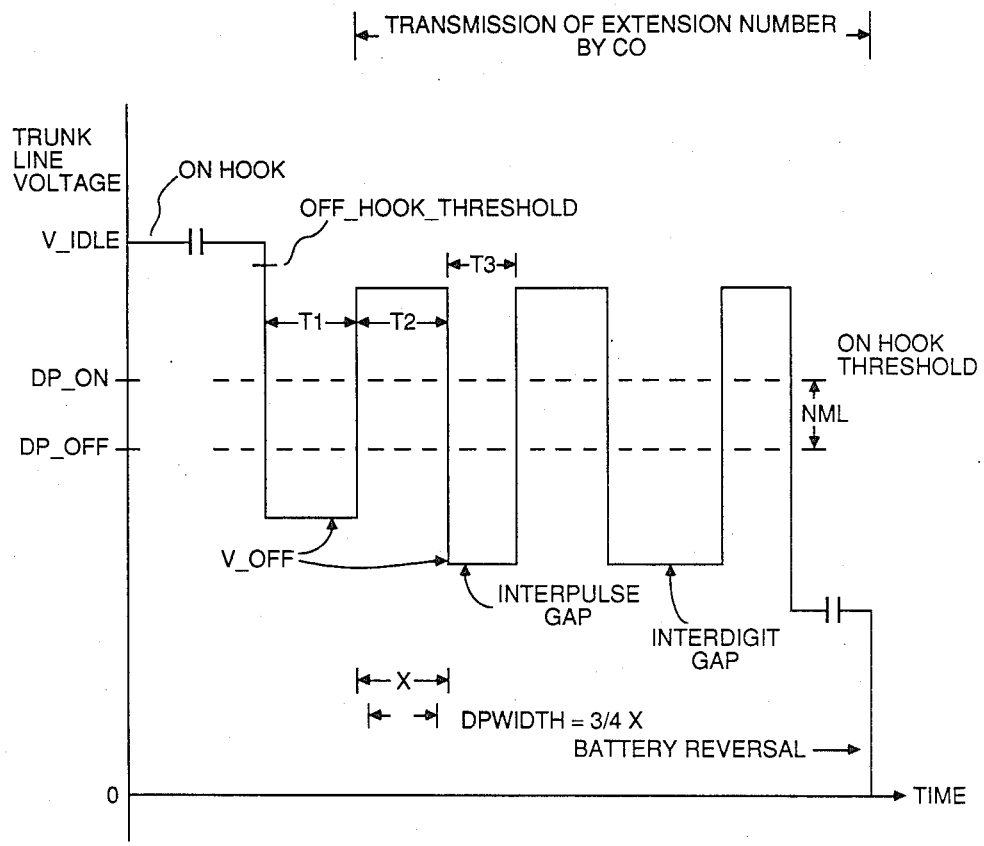
FIG. 10 depicts the line voltage of a DID trunk line during a typical call sequence using pulse coding.

FIG. 10 depicts the line voltage on a DID trunk line as a new call is connected to the PBX. While this figure shows pulse coded digit dialing, the beginning and ends of FIG. 10 also apply to systems in which the extension number is sent to the PBX using DTMF tones.

V_IDLE is the average line voltage while the trunk line is idle, V_OFF is the line voltage representing the low voltage portion of each pulse, DP_ON is the threshold voltage used for denoting the high voltage portion of each pulse, and DP_OFF is the threshold voltage used for denoting the low voltage portion of each pulse. ON_HOOK_THRESHOLD, which in the preferred embodiment is equal to DP_ON, is the threshold voltage for determining when a line has gone On Hook. NML, which stands for "no man's land", is the range of voltage levels between DP_OFF and DP_ON.

OFF_HOOK_THRESHOLD is the voltage marking the transition from an On Hook condition to an Off Hook condition. In the preferred embodiment, the line is considered to be Off Hook if the line voltage falls ten percent below its voltage V_IDLE when the line is idle, and remains below that threshold level for at least 100 milliseconds (T1 in FIG. 10).

As will be understood by those skilled in the art, some Central Office systems require the PBX to acknowledge seizure of the line by the CO (i.e., the onset of Off Hook) by sending a "wink" signal to the CO. The wink signal is a brief battery reversal. This variation in the calling sequence is not shown in FIG. 10.

Pseudocode Appendices. Reference should be made to FIGS. 7-10, and Appendices 1-2 while reading the following description. Appendices 1-2 at the end of this description contain pseudocode representations of the Background and Interrupt software routines relevant to the present invention.

The pseudocode used in these appendices is, essentially, a computer language using universal computer language conventions. While the pseudocode employed here has been invented solely for the purposes of this description, it is designed to be easily understandable to any computer programmer skilled in the art.

The following are some notes on the syntax of this pseudocode:

Comments. Comments, i.e., nonexecutable statements, begin with "—". All text on the rest of that line, after a "—", is a comment.

Multiline Statements. Statements continue from line to line as needed.

If Statement. The syntax used is:

|    | IF | condition |    |
|---|---|---|---|
|    |    | block of statements |    |
|    | ELSE |    | – optional |
|    |    | block of statements | – optional |
|    | END |    |    |
| or: |    |    |    |
|    | IF | condition |    |

|    | ELSEIF | block of statements condition | – optional |
|---|---|---|---|
|    |    | block of statements | – optional |
|    | END |    |    |

Loops. The syntax used is:
DO for I=A to B
—block of statements—
ENDLoop
or
DO—condition—
block of statements—
ENDLoop Background Routine. The primary task of the background loop, as shown in FIG. 8, is to poll each trunk line x to determine whether it is On Hook or Off Hook (box 160) by checking the line voltage signal LVx. If the line is On Hook, the status of the line is noted as being idle (STATUS=0).

Once trunk line x goes Off Hook, the integration device sets STATUSx=1 (for decoding and storing the incoming extension number). The status of each trunk line is updated as the CO and PBX step through each step of the standard telephone call sequence.

At all times during the telephone call sequence, the background loop monitors the line voltage signal LVx (see box 160) to see if the call has been terminated. In particular, if the line voltage LVx remains above ON_HOOK_THRESHOLD for at least 200 milliseconds, the background routine (i.e., the integration device) will denote at line as being On Hook.

Referring once again to boxes 160 and 164 in FIG. 8, the interpretation of the LVx signals depends on the current status of the trunk lines. When the trunk line is On Hook (i.e., idle), the software computes a running average of the line voltage called V_IDLE. The threshold for detecting a transition to an Off Hook status, OFF_HOOK_THRESHOLD, is equal to approximately ninety percent of V_IDLE. The line voltage must remain below the Off Hook threshold for at least 100 milliseconds to denote an Off Hook condition.

Once it is determined that the line voltage has remained below the Off Hook threshold long enough to denote a true Off Hook condition, the status of the trunk line is changed to STATUSx=1 (for decoding and storing the extension number being sent to the PBX). At this point DP_ON and ON_HOOK_THRESHOLD (see FIG. 10) are each given an initial value halfway between V_IDLE and an average value of the line's Off Hook voltage.

Still referring to box 160 in FIG. 8, for trunk lines that are not idle (i.e., have a status value other than 0), the background routine looks for the termination of a call by looking to see if the line voltage stays above the DP_ON level for over 200 milliseconds.

Note that the software for decoding the extension number sent by the CO, and for detecting playback tones, is described with reference to FIG. 9, below.

Next (box 162), if the line has STATUS=3, indicating that a playback signal has been received, the background routine transmits the stored extension number to the VMS. Note that there is a predefined, industry standard, sequence for transmitting digits using DTMF tones. Thus each digit must be transmitted for a specified period of time, followed by a specified period of silence, until the series of digits has been transmitted. As will be understood by those skilled in the art, it is a relatively simple matter to load the appropriate values into a DTMF transceiver in accordance with this predefined sequence. The routine simply updates a timer for each line on which digits are being transmitted, and follows the specified sequence of actions as time passes. In particular, extension numbers are transmitted using the following sequence of steps:

Set isolation relays (done by interrupt routine)
Transmit each digit for about 100 milliseconds followed by about 100 milliseconds of silence
Reset isolation relays Another function performed by the background loop is to check a "last digit timer" while the extension number is being received from the CO, to determine if an unreasonably long period of time passes between the receipt of each digit of the extension number transmitted by the CO—indicating that the dialing process was aborted, or that some other line error occurred. See box 166 If this happens, the background routine ignores the digits sent by the CO, and waits for the next call (i.e., the next line·seizure at the beginning of a new call, STATUSx=0).

Since the background loop runs continuously, as soon as one line has been processed the trunk line index is set for processing the next trunk line (box 168). In addition, the LEDs 112 which denote the status of the lines are updated in accordance with Table 4, at the end of the background loop-after all of the lines have processed (box 170).

TABLE 4

| LED Status | Corresponding Trunk Line Condition |
|---|---|
| OFF | On Hook (Inactive) |
| ON | Doing Call Progression, or Waiting for nonintegrated Call to Terminate |
| Pulse at 1 Hz | Integrated Call in Progress (Flashing) |
| Pulse at 10 Hz | No Trunk Connected (Flickering) |

Referring to Appendix 1, there is provided a detailed pseudocode specification for the tasks performed by the background routine.

Periodic Interrupt Routine. Referring to FIG. 9, there is shown a state diagram for the periodic interrupt routine for digit decoding used in the preferred embodiment. This routine runs once every 2.5 milliseconds and process all eight trunk lines each time that it runs. The purpose of the routine is to time filter, debounce and decode incoming signals. Filtering and digit decoding are accomplished by repeatedly calling the routine and thereby following the signals generated by the CO and PBX.

In this routine, the signals are indexed by trunk line number, using the variable y to distinguish from the index used in the background routine (see FIG. 8).

Different parts of the interrupt routine are used, depending of the status of the trunk line being processed. The interrupt routine performs as a classic state machine, and each state denoted in FIG. 9 corresponds to a particular line condition or point in a dialing sequence.

For instance, when STATEy=IDLE, this means that trunk line "y" is inactive—i.e., no call is in progress on that line.

The following explanation of the interrupt routine refers to both FIG. 9 and the corresponding sections of Appendix 2. Note that each section of Appendix 2 is clearly marked so as denote the corresponding portion of the state diagram in FIG. 9.

STATEy=IDLE or ONHK. When the line is idle, no processing is performed by the interrupt program for that line.

DTMF Decoding

STATEy=DTMF. When an Off Hook condition is detected (by the background routine discussed above), the interrupt routine gives that line a status of STATEy=DTMF if the CO is using DTMF signals to transmit extension numbers.

Since DTMF signals follow an industry standard format, and the DTMF receiver chips provide decoded signal values, it is a simple matter to determine the extension number sent by the CO. DTMF signal decoding was described above with respect to FIG. 6. The only addition to be noted here is that each DTMF encoded digit must be transmitted for at least 42.5 milliseconds, and digits must be separated by at least 40 milliseconds of silence. As will be understood by those skilled in the art, the procedure for capturing a sequence of DTM encoded digits is well known.

When STATEy=DTMF, if the DTMF receiver for this line receives a DTMF tone, then STATEy is set to DTMFV to process the digit being transmitted.

After the CO has transmitted all of the digits for a particular extension number (i.e., the number of digits #STORED_DIGy which have been received and stored in the Extension Number Storage Array is equal to the length of the extension numbers use by the PBX in the system), STATEy is set to BATREV where the integration device waits for the call to be answered (i.e., STATUS=2, WAITING FOR BATTERY REVERSAL). In addition, the "last digit timer", which checks that all digits are received in a reasonable period of time, is turned off since all of the digits have been received.

In some telephone systems, the PBX must "wink" at the CO to acknowledge seizure of the DID trunk line by the CO, before the CO will transmit the extension number to be used by the PBX. The "wink" is a momentary battery reversal. It is important to detect such winks so that the resulting noise on the trunk line can be ignored by the software.

If a battery reversal occurs when STATEy=DTMF, and the battery reversal lasts at least 100 milliseconds, this indicates that the PBX is generating a wink, and the interrupt routine sets STATEy=ANSR.

STATEv=ANSR. After a wink has been detected, the system waits until the wink has terminated (i.e., battery reversal has ceased) for 70 milliseconds, so that the ensuing line noise does not affect the software, before resetting STATEy to DTMF to resume normal processing of the incoming extension number.

STATEv=DTMFV. If the DTMF tone detected lasts for at least 40 milliseconds, it is accepted and STATEy is set to DTMFW. If the tone lasts less than 40 milliseconds, the detected tone is assumed to have been line noise, and STATEy is reset to DTMF.

STATEv=DTMFW. After a DTMF tone has been accepted, the system waits for a period of at least 40 milliseconds during which no DTMF tone is received. It then stores the digit value corresponding to the previously received DTMF tone in the Extension Number Storage Array, and resets STATEy to DTMF for receiving the next digit. Also, the "last digit timer" is reset each time that a digit value is stored.

Pulsed Digit Decoding

If the CO transmits extension numbers using pulse coded digits, the process of decoding the extension number is much more complicated than the process of decoding DTMF signals. Pulse coded signals are more difficult for the integration device 30 to decode than for the PBX 20 because the integration device 30 cannot directly detect the current in the trunk line—it uses only line voltages. The primary problem is that the upper and lower voltage levels for the tops and bottoms of pulses vary significantly from one installation to another. Another significant problem is distinguishing between line noise and real dial pulses sent by the CO.

Thus the primary task of the initial steps of dial pulse detection is to characterize what voltage levels denote the "make" (low voltage) and "break" (high voltage) portions of the dial pulses on each trunk line. While the system is waiting for the first pulse, the sampled line voltage values are stored in memory—in a data structure called the sample or ring buffer. A pulse is detected by noting when the line voltage rises above DP_ON, which is calculated when an Off Hook condition is first detected.

When the first pulse is detected, new values for V_OFF and DP_OFF (see FIG. 10) are calculated because the low voltage of the dial pulses may be lower than initial Off Hook voltage. V_OFF is set equal to the average of four samples from the sample buffer which represent the middle of the low voltage region after this pulse. DP_OFF is set equal to the new V_OFF plus one fourth of the differential between the originally measured values for V_OFF and V_IDLE.

This method of providing pulse threshold levels which are computed "on the fly" is designed to accommodate telephone systems with different voltage levels, and also to accommodate PBX's at different distances (and therefore having varying strength signals) from the CO. In alternate embodiments of this invention, this method of pulse decoding could be implemented using somewhat different threshold levels for distinguishing the tops and bottoms of pulses.

Given these threshold levels, the interpretation and decoding of pulse coded digits proceeds using standard dial pulse decoding. Thus, there are standard requirements for the minimum length T2 of each pulse, the minimum and maximum length of time T3 between the pulses of a single digit, the minimum length of time T4 between the digits, and so on.

Table 5 shows the values of the parameters T1-T7 used in the preferred embodiment.

TABLE 5

| Parameter | Description | Value |
|---|---|---|
| T1 | minimum time with low LV to denote line as Off Hook | 100 ms |
| T2, min | minimum pulse width | 30 ms |
| T2, max | maximum pulse width | 200 ms |
| T3, min | minimum inter-pulse width | 10 ms |
| T3, max | maximum inter-pulse width | 119 ms |
| T4 | minimum inter-digit width | 120 ms |
| T5 | length of time with LV above ON_HOOK_THRESHOLD before denoting line as On Hook | 200 ms |
| T6 | minimum playback signal width | 150 ms |
| T7 | minimum time to establish continuous BRV status | 100 ms |

STATEy=DPSTART. When an Off Hook condition is detected (by the background routine discussed above), the interrupt routine gives that line a status of STATEy=DPSTART if the CO is using dial pulses to transmit extension numbers, or STATEy=DTMF is the CO is using DTMF signals.

When STATEy=DPSTART, the interrupt routine looks for the first pulse on the line by looking for a line voltage LVx greater than DP_ON for at least 30 milliseconds. Each time that the line voltage remains below DP_ON for 7.5 milliseconds, the timer for finding the first pulse is restarted. When the first pulse is detected, STATEy is set to DPON for processing that first pulse.

STATEy=SWINK. In some telephone systems, the PBX must "wink" at the CO to acknowledge seizure of the DID trunk line by the CO, before the CO will transmit the extension number to be used by the PBX. The "wink" is a momentary battery reversal. It is important to detect such winks so that the resulting noise o the trunk line can be ignored by the software.

If a battery reversal occurs when STATEy=DPSTART, this indicates that the PBX is generating a wink by setting STATEy to SWINK. In Dial Pulse mode, it is especially important to detect winks because the noise generated on the trunk line by the winking procedure might otherwise be interpreted as dial pulses. If the battery reversal lasts less than 100 milliseconds, it is treated as a "false alarm" (i.e., a spurious signal), and the STATEy is set to DPSTART. If a full 100 millisecond wink is detected, STATEy is set to EWINK.

STATEy=EWINK. After a wink has been detected, the system waits until the wink has terminated (i.e., battery reversal has ceased) for 70 milliseconds, so that the ensuing line noise does not affect the software, before resetting STATEy to DPSTART to resume normal processing of the incoming extension number.

STATEy=DPON. At this point, the system waits until the first pulse has terminated, by waiting for LVx to be below DP_OFF for 7.5 milliseconds. Since the length of dial pulses varies from system to system, a parameter called DPWIDTH is set in accordance with the width of the first pulse received from the CO. In the preferred embodiment, DPWIDTH is set equal to three fourths of the length of this first pulse. All following pulses are required to be at least DPWIDTH in width. Note that the T2,min and T2,max constraints on pulse length are automatically applied because a pulse of less than T2,min will not reach STATEy=DPON, and a pulse greater than T2,max will cause the system to reset the status of the line back to IDLE (see discussion of the background routine, above).

After DPWIDTH has been assigned a value, STATEy is set to DPOFF.

STATEy=DPOFF. Once the first pulse has ended, it may be followed immediately by another pulse (after a low voltage period of less than 70 milliseconds) if the first digit has a value greater than one, or it may be followed by a low voltage period of at least 70 milliseconds if the first digit does have a value equal to one. In either case the interrupt routine recalculates V_OFF and DP_OFF by storing the line voltage LVx in a buffer called DP_RING while LVx remains below DP_OFF. Once a new pulse starts, or the low voltage period has continued for 70 milliseconds, V_OFF is set equal to the average of the four middle values in DP_RING during which LVx was below DP_OFF. Then DP_OFF is set equal to V_OFF+DPDEL, where DPDEL was previously calculated by the background routine as one fourth of the difference between the V_IDLE voltage and the V_OFF value calculated before the first pulse.

If the first pulse is followed immediately by another pulse (i.e., LVx is above DP_ON for 7.5 milliseconds after a low voltage period of less than 70 milliseconds) STATEy is set to DIGST, otherwise STATEy is set to DIGOFF.

STATEy=DIGST. As noted above, valid dial pulses (as opposed to line noise which may initially look like a valid dial pulse) must have a length of at least DPWIDTH—which was calculated to be three fourths of the width of the first dial pulse observed by the integration device during the current dialing sequence. When the state of a line is DIGST, the interrupt routine checks whether the length of an apparent pulse is at least DPWIDTH long. If the pulse is less than DPWIDTH long, (i.e., if the line voltage falls below DP_ON for at least five milliseconds before the length of the pulse reaches DPWIDTH), the apparent pulse is treated as noise and STATEy is set to DIGOFF. If the pulse has a length of at least DPWIDTH, it is treated as a real dial pulse, in which case STATEy is set to DIGON.

STATEy=DIGON. When a pulse terminates, LVx should remain below DP_OFF for at least 10 milliseconds. If this happens, the digit value DIGIT_VALUE is incremented (following the standard pulse counting procedure) and then STATEy is set to DIGOFF. If, however, it floats in the NML (no man's land) voltage range between DP_ON and DP_OFF for 50 milliseconds, the pulse is treated as a bad pulse (i.e., DIGIT_VALUE is not incremented) and STATEy is set to DIGOFF.

STATEy=DIGOFF. At this point the CO is between pulses, and the interrupt routine determines if this pause is a pause between the pulses of a single digit, or a pause between digits.

If LVx remains below DP_ON for 110 milliseconds, it is a pause between digits. The current value of DIGIT_VALUE is stored in the Extension Number Storage Array (unless DIGIT_VALUE is equal to zero, indicating that no valid dial pulses have been received), DIGIT_VALUE is reset to zero, and STATEy is set to DIGWT. Also, the "last digit timer" is reset each time that a digit value is stored.

If a new pulse starts (i.e., LVx remains above DP_ON for five milliseconds) before the pause between pulses reaches 110 milliseconds, the pulse is part of the same digit as the previous pulse and STATEy is set to DIGST.

STATEy=DIGWT. The DIGWT state is used between digits being transmitted by the CO. If the number of digits which has already been stored in the Extension Number Storage Array is equal to the number of digits in the extension numbers used by the PBX, the CO has completed transmission of the extension number, and the integration device sets STATEy to BATREV to wait for the call to be answered. In addition, the "last digit timer" is deactivated.

If, however, there are more digits yet to be received, the integration device waits until it sees the beginning of a new pulse (marked by the line voltage remaining above DP_ON for five milliseconds) and then sets STATEy to DIGDET.

Occasionally, in some systems, there is a battery reversal between two digits. If a battery reversal of at least 100 milliseconds occurs, the integration devices sets STATEy to DIGGP to avoid processing the ensuing line noise as pulse data.

STATEy=DIGGP. When STATEy is set to DIGGP, the systems stays in this state until the battery reversal remains off for at least 70 milliseconds. At that point STATEy is set back to DIGWT for processing any following digits.

STATEy=DIGDET. DIGDET is entered at the beginning of an apparent pulse. If however, the line voltage falls below DP_ON for 7.5 milliseconds without the pulse lasting at least DPWIDTH, the apparent pulse is treated as line noise and state is reset to DIGWT. If the pulse does last DPWIDTH, the state is set to DIGON to process this pulse.

STATEy=BATREV. When the system sets STATEy to BATREV, it means that all of the digits sent by the CO have been received, and therefore it is time for the integration device to wait for the call to be answered.

When (and if) the call is answered, the PBX performs a battery reversal. The integration sets STATEy to TONE when it observes a battery reversal for 100 milliseconds.

STATEy=TONE. Once the call is answered, the integration device waits six seconds to determine if the call was answered by a voice mail system (VMS). If the VMS answers the call it will generate a playback tone at a predefined frequency. If the integration device receives a tone at that frequency with a duration of at least 150 milliseconds, the integration device assumes that the VMS answered the call and generated the playback tone. In response, RELAYy is closed (to activate the caller isolation circuit 40 in FIG. 3 during transmission of the stored extension number to the VMS), and STATEy is set to DELAY.

If no tone is received for 6 seconds, the integration device assumes that the call has not been forwarded to the Voice Mail System, and thus STATEy is set to ONHK. In other words, referring to FIG. 7, the status of the line is set to 5, WAITING FOR CALL TO TERMINATE, and the integration device merely waits for the call to terminate. The background routine will eventually set STATEy=IDLE when it observes that voltage on line y remains above the ON_HOOK_THRESHOLD for 200 milliseconds (see above discussion of the background routine).

STATEy=DELAY. At this point, the system waits 150 milliseconds for the VMS tone to terminate and for the relays in the caller isolation circuit 40 to settle down. Then it sets ReadyToDial.y to Yes, thereby enabling the background routine to transmit the stored extension number digits to the VMS. Finally, STATEy is set to ONHK, where it remains until the background routine determines that voltage on line y has remained above ON_HOOK_THRESHOLD for 200 milliseconds, and that therefore the current call on this line has terminated.

Alternate Embodiments

While the present invention has been described with reference to a few specific embodiments, the description is illustrative of the invention and is not to be construed as limiting the invention. Various modifications may occur to those skilled in the art without departing from the true spirit an scope of the invention as defined by the appended claims.

For instance, see the embodiment shown in FIG. 2. In a variation of the embodiment shown in FIG. 2, it would be possible to provide a direct connection between the integration device 30 and the VMS 32 so that the extension number is not transmitted over the PBX telephone line used by the caller. Such an alternate embodiment would need other features, such as means in the VMS 32 for transmitting a unique marker with the playback signal, and means in the integration device to retransmit the marker and the extension number back to the VMS. In this way, the VMS could determine which incoming call corresponds to the extension number transmitted by the integration device.

APPENDIX 1

PSEUDOCODE FOR BACKGROUND ROUTINE

```
POWER-ON OR RESET
    FOR x = 0 to 7
        Call ON_HOOK(x)
        If LVx < Noise            -- Check for Disconnected
            Set Flickering.x = On -- Trunk Line
        END
    ENDLoop
    x = 0

DO WHILE                          -- Loop Runs Continuously

-- POLL FOR ON/OFF HOOK:

If On.Hook.x (STATUSx = 0 = IDLE)
    IF LVx < OFF_HOOK_THRESHOLDx
        IF Changing.Hook.State.x = Yes
            IF Timer - Hook.Timer.x ≥ T1    -- 100 ms
                -- Timer is a a periodically updated clock
                Set LED.x = On
                Changing.Hook.State.x = No
                V_OFFx = Average of values in Ring.Buffer.x
                DP_ONx  = ( V_OFFx + V_IDLEx )/2
                DP_OFFx = DP_ONx
                ON_HOOK_THRESHOLDx = DP_ONx
                DPDELx = (V_IDLEx - V_OFFx)/4
                IF Mode = DTMF
                    State = DTMF
                ELSE
                    State = DPSTART
                END
                Digit.Timer.x = TIMER
                Set Last.Digit.Timer.Active.x = Yes
            END
        ELSE        -- (Changing.Hook.State.x = No)

Changing.Hook.State.x = Yes
            Hook.Timer.x = Timer
            Set Running.Average.x = Off
        END
    ELSE                          -- (LVx ≥ OFF_HOOK_THRESHOLDx)
        Changing.Hook.State.x = No
        Set Running.Average.x = On
    END
```

-- APPENDIX 1, Continued
-- PSEUDOCODE FOR BACKGROUND ROUTINE

```
ELSE                              -- (line x not On Hook)

IF LVx ≤ ON_HOOK_THRESHOLDx
        Changing.Hook.State.x = No
    ELSE
        IF Changing.Hook.State.x = Yes
            IF Timer - Hook.Timer.x ≥ 200 milliseconds   -- T5
                DO ON_HOOK(x)
            END
        ELSE
            Changing.Hook.State.x = Yes
            Hook.Timer.x = Timer
        END
    END
END
```

-- DIALING --

-- BEGIN DIALING DIGIT STRING:

```
IF Digits.ReadyToDial.x = Yes
    Digits.ReadyToDial.x = No
    Tone.On.x = No
    Dialing.x = Yes
    Need.Digit.Started.x = Yes
    Offset.x = 0
END
```

-- START DIALING A DIGIT:

```
IF Need.Digit.Started.x = Yes
    Need.Digit.Started.x = No
    Tone.On.x = Yes
    DTIMERx = Timer
    Current.Digit.x = Digits[Offset.x]
    Start DTMF.x with tone for Current.Digit.x
END
```

-- STOP TONE:                     -- ToneTime = 100 milliseconds

```
IF Tone.On.x = Yes  AND  Timer - DTIMERx ≥ ToneTime
    Turn off tone generator DTMF.x
    Tone.On.x = No
END
```
-- APPENDIX 1, Continued
-- PSEUDOCODE FOR BACKGROUND ROUTINE

-- SILENCE TIMING AND NEXT DIGIT CHECK:

```
IF (Dialing.x = Yes  AND  Tone.On.x = No
    AND  Timer - DTIMERx ≥ ToneTime)
    Increment Offset.x
    IF Offset.x = Length of digit string
        Dialing.x = No
        Open Relay.x
```

```
            ELSE
                Need.Digit.Started.x = Yes
            END
    END --  LAST DIGIT TIMING:
IF (Last.Digit.Timer.Active.x = Yes
    AND  Timer - Digit.Timer.x ≥ 10.5 seconds )
    DO ON_HOOK(x)
END

--  FORM AVERAGE:

IF Average.Running.x = On
    V_IDLEx = V_TOTALx/256
    OFF_HOOK_THRESHOLDx = V_IDLEx - V_IDLEx/10
    IF OFF_HOOK_THRESHOLDx ≥ Noise    --  Chk if trunk line is
        If Flickering.x = On          --  connected.
            Set Flickering.x = Off    --  Flickering indicates
            Set LED.x = Off           --  device is not connected
        END                           --  to trunk line.
    ELSE
        OFF_HOOK_THRESHOLDx = 0
    END
END

--  PROCESS NEXT LINE:

x = x + 1
IF x = 8
    UPDATE all LEDs
    x = 0
END

ENDLOOP          --  END OF MAIN LOOP
--   APPENDIX 1, Continued
--   PSEUDOCODE FOR BACKGROUND ROUTINE SUBROUTINE: DO ON_HOOK (x)

State.x = IDLE           --  Clean Up State Variables
On.Hook.x = Yes
Open Relay.x
Reset DTMF.x
Digits.Length.x = 0
Digits.ReadyToDial.x = No
Tone.On.x = No
Dialing.x = No.
Need.Digit.Started.x = No
Changing.Hook.State.x = No
Last.Digit.Timer.Active.x = No LED.x = Off              --  Reset LED
Flickering.x = Off
Flashing.x = Off V_IDLEx  = Average of Last 4 Samples in Ring Buffer x
V_TOTALx = V_IDLEx * 256  + V_IDLEx
OFF_HOOK_THRESHOLDx = 0.9 * V_IDLEx
```

Set Average.Running.x = On

Return

APPENDIX 2

PSEUDOCODE FOR INTERRUPT ROUTINE
(RUN ONCE EACH 2.5 MILLISECONDS)

```
y = 0                         -- line selector
DO WHILE y < 8                -- MAIN LOOP Store LVy in Ring.Buffer.y    -- holds last 4 LVy values
    If Running.Average.y = On
        V_TOTALy = V_TOTAL + LVy - V_TOTALy/256
    END BEGIN CASE (STATEy)

CASE: STATEy = IDLE  OR  STATEy = ONHK        -- RESET COUNTERS

LENGTH_BRV_OFFy = LENGTH_BRV_ONy = 0
LENGTH_TONEy = LENGTH_ONy = LENGTH_OFFy = 0

CASE: STATEy = DTMF           -- DTMF TONE DETECTION

IF DTMF_IN
    STATEy = DTMFV            -- DECODE DTMF TONE
END

IF #STORED_DIGy = MAX_DIG     -- E.G., 3, 4 OR 5
    STATEy = BATREV           -- ALL DIGITS RECEIVED
    Last.Digit.Timer.Active.y = No    -- Turn off Timer
END IF BRVy = ON                  -- LOOK FOR WINK
    INCREMENT LENGTH_BRV_ONy
    IF LENGTH_BRV_ONy ≥ 100 milliseconds
        STATEy = ANSR         -- WINK DEBOUNCING
        LENGTH_BRV_OFFy = LENGTH_BRV_ONy = 0
    END
END CASE: STATEy = ANSR           -- WINK DEBOUNCING IN DTMF MODE IF BRVy = OFF
    INCREMENT LENGTH_BRV_OFFy
    IF LENGTH_BRV_OFFy ≥ 70 milliseconds
        STATEy = DTMF
        LENGTH_BRV_OFFy = LENGTH_BRV_ONy = 0
    END
END
-- APPENDIX 2, Continued
-- PSEUDOCODE FOR INTERRUPT ROUTINE CASE: STATEy = DTMFV          -- WAIT FOR FULL DTMF TONE
```

```
IF DTMF_INPUTy = ON
    INCREMENT LENGTH_TONEy
    IF LENGTH_TONEy ≥ 40 milliseconds
        STATEy = DTMFW
        LENGTH_TONEy = 0
    END
ELSE
    INCREMENT LENGTH_OFFy
    IF LENGTH_OFFy ≥ 40 milliseconds
        LENGTH_OFFy = 0          -- "DTMF TONE" WAS APPARENTLY
        STATEy = DTMF            -- LINE NOISE
    END
END CASE: STATEy = DTMFW             -- DECODE DTMF TONE IF DTMF_INPUTy = OFF
    INCREMENT LENGTH_TONEy
    IF LENGTH_TONEy ≥ 40 milliseconds
        STORE DIGIT VALUE = DTMF VALUE
        INCREMENT #STORED_DIGy
        STATEy = DTMF
        Digit.Timer.y = Timer                -- Reset Last
        Last.Digit.Timer.Active.y = Yes      -- Digit Timer
        LENGTH_TONEy = 0
    END
END CASE: STATEy = DPSTART           -- NEW OFF HOOK CONDITION
                                 -- DIAL PULSE MODE
IF BRVy = ON
    STATEy = SWINK               -- PBX IS "WINKING"
END IF LVy ≥ DP_ONy                  -- LOOK FOR FIRST PULSE
    INCREMENT LENGTH_ONy
    IF LENGTH_ONy ≥ 30 milliseconds
        STATEy = DPON
        DIGIT_VALUEy = 0
        LENGTH_OFFy = LENGTH_BRV_OFFy = LENGTH_BRV_ONy = 0
    END
ELSE                             -- NO PULSE YET
    INCREMENT LENGTH_OFFy
    IF LENGTH_OFFy ≥ 7.5 milliseconds
        LENGTH_ONy = LENGTH_OFFy = 0
    END
END
-- APPENDIX 2, Continued
-- PSEUDOCODE FOR INTERRUPT ROUTINE CASE: STATEy = SWINK IF BRVy = ON                     -- SIT TIGHT DURING WINK
    INCREMENT LENGTH_BRV_ONy
    IF LENGTH_BRV_ONy ≥ 100 milliseconds
        STATEy = EWINK
        LENGTH_BRV_OFFy = LENGTH_BRV_ONy = 0
    END
ELSE                             -- CHECK FOR END OF WINK
```

```
            LENGTH_BRV_ONy = 0
            INCREMENT LENGTH_BRV_OFFy
            IF LENGTH_BRV_OFFy ≥ 5 milliseconds
                STATEy = DPSTART
                LENGTH_BRV_OFFy = 0
            END
    END CASE: SUBSTATEy = EWINK             -- MAKE SURE WINK HAS ENDED IF BRVy = OFF
        INCREMENT LENGTH_BRV_OFFy
        IF LENGTH_BRV_OFFy ≥ 70 milliseconds
            STATEy = DPSTART
            LENGTH_BRV_OFFy = 0
        END
    END CASE: STATEy = DPON                 -- FIRST PULSE
    IF LVy ≤ DP_OFFy                    -- Look for end of pulse
        INCREMENT LENGTH_OFFy
        IF LENGTH_OFFy ≥ 7.5 milliseconds
            STORE LVy IN DP_RING
            SET DPWIDTH = 3 * LENGTH_ONy/4    -- Set Pulse Width
            LENGTH_ONy = LENGTH_OFFy = 0      -- Parameter
            DIGIT_VALUEy = 0
            STATEy = DPOFF
        END
    ELSE
        INCREMENT LENGTH_ONy
    END -- APPENDIX 2, Continued

-- PSEUDOCODE FOR INTERRUPT ROUTINE

CASE: STATEy = DPOFF                -- FIRST PULSE ENDED

IF LVy ≤ DP_OFFy                    -- ReCalculate V_OFF
        STORE LVy IN DP_RING            -- and DP_OFF
        INCREMENT LENGTH_OFFy
        IF LENGTH_OFFy ≥ 70 milliseconds
            INCREMENT DIGIT_VALUEy
            V_OFFy = Average of the 4 middle values in DP_RING
            DP_OFFy = V_OFFy + DPDELy          -- SEE BACKGROUND
            LENGTH_ONy = LENGTH_OFFy = 0

STATEy = DIGOFF
        END
    ELSEIF LVy ≥ DP_ONy                 -- Look for Next Pulse
        INCREMENT LENGTH_ONy
        IF LENGTH_ONy ≥ 7.5 milliseconds
            INCREMENT DIGIT_VALUEy
            V_OFF = Average of the 4 middle values in DP_RING
            DP_OFFy = V_OFFy + DPDELy          -- SEE BACKGROUND
            LENGTH_ONy = LENGTH_OFFy = 0

STATEy = DIGST
        END
    END
```

```
STATEy = DIGST                              -- START NEW PULSE
IF LVy ≥ DP_ONy
    INCREMENT LENGTH_ONy
    IF LENGTH_ONy ≥ DPWIDTH - 5 milliseconds
        LENGTH_ONy = LENGTH_OFFy = 0
        STATEy = DIGON
    END
ELSE                                        -- False Start?
    INCREMENT LENGTH_OFFy
    IF LENGTH_OFFy ≥ 5 milliseconds
        LENGTH_ONy = LENGTH_OFFy = 0
        STATEy = DIGOFF
    END
END CASE: STATEy = DIGON                        -- END OF PULSE IF LVy ≤ DP_OFFy
    INCREMENT LENGTH_OFFy
    IF LENGTH_OFFy ≥ 10 milliseconds
        INCREMENT DIGIT_VALUEy
        LENGTH_ONy = LENGTH_OFFy = 0
        STATEy = DIGOFF
    END -- APPENDIX 2, Continued

-- PSEUDOCODE FOR INTERRUPT ROUTINE

ELSE                                        -- LVy > DP_OFFy
    IF LVy < DP_ONy                         -- No Man's Land (NML)
        INCREMENT LENGTH_ONy                -- NML counter
        IF LENGTH_ONy ≥ 50 milliseconds -- DO NOT INCREMENT DIGIT_VALUE  -- BAD PULSE
                LENGTH_ONy = LENGTH_OFFy = 0
                STATEy = DIGOFF
        END
    END
END CASE: STATEy = DIGOFF                       -- BETWEEN PULSES IF LVy < DP_ONy                             -- STILL BETWEEN PULSES ?
    INCREMENT LENGTH_OFFy
    IF LENGTH_OFFy ≥ 110 milliseconds
        STORE DIGIT_VALUEy IN DIGITS ARRAY
        INCREMENT #STORED_DIGy
        DIGIT_VALUEy = 0
        LENGTH_ONy = LENGTH_OFFy = 0
        Digit.Timer.y = Timer               -- Reset Last
        Last.Digit.Timer.Active.y = Yes     -- Digit Timer
        STATEy = DIGWT
    END
ELSE                                        -- CHECK FOR NEW PULSE
    INCREMENT LENGTH_ONy
    IF LENGTH_ONy ≥ 5 milliseconds STATEy = DIGST         -- START PROCESSING NEW PULSE
        LENGTH_ONy = LENGTH_OFFy = 0
    END
END
```

```
CASE: STATEy = DIGWT                  -- WAIT BETWEEN DIGITS

IF #STORED_DIGy = MAX_DIG             -- E.G., 3, 4 OR 5
    STATEy = BATREV                   -- ALL DIGITS RECEIVED
    Last.Digit.Timer.Active.y = No    -- Turn off Timer
END IF LVy ≥ DP_ONy                       -- LOOK FOR NEXT PULSE
    INCREMENT LENGTH_ONy
    IF LENGTH_ONy ≥ 5 milliseconds
        STATEy = DIGDET
        LENGTH_ONy = 0
    END
END -- APPENDIX 2, Continued
-- PSEUDOCODE FOR INTERRUPT ROUTINE IF BRVy = ON                          -- LOOK FOR BREV GAP BTWN DIGITS
    INCREMENT LENGTH_BRV_ONy
    IF LENGTH_BRV_ONy ≥ 100 milliseconds
        STATEy = DIGGP
        LENGTH_BRV_OFFy = LENGTH_BRV_ONy = 0
    END
END STATEy = DIGDET                       -- START NEW PULSE
IF LVy ≥ DP_ONy
    INCREMENT LENGTH_ONy
    IF LENGTH_ONy ≥ DPWIDTH - 5 milliseconds
        LENGTH_ONy = LENGTH_OFFy = 0
        STATEy = DIGON
    END
ELSE                                  -- False Start?
    INCREMENT LENGTH_OFFy
    IF LENGTH_OFFy ≥ 7.5 milliseconds
        LENGTH_ONy = LENGTH_OFFy = 0
        STATEy = DIGWT
    END
END CASE: STATEy = DIGGP                  -- PROCESS BREV GAP BETWEEN DIGITS IF BRVy = OFF                         -- WAIT FOR END OF BREV
    INCREMENT LENGTH_BRV_OFFy
    IF LENGTH_BRV_OFFy ≥ 70 milliseconds
        STATEy = DIGWT
        LENGTH_BRV_OFFy = LENGTH_BRV_ONy = 0
    END
END CASE: STATEy = BATREV                 -- WAIT FOR CALL TO BE ANSWERED IF BRVy = ON
    INCREMENT LENGTH_BRV_ONy
    IF LENGTH_BRV_ONy ≥ 100 milliseconds
        STATEy = TONE
        LENGTH_BRV_ONy = 0
        LENGTH_TONEy = 0
        LENGTH_ONy = LENGTH_OFFy = 0
    END
END
```

-- APPENDIX 2, Continued
-- PSEUDOCODE FOR INTERRUPT ROUTINE

```
CASE: STATEy = TONE              -- WAIT FOR VMS TONE

IF TONEy = ON
    INCREMENT LENGTH_TONEy
    IF LENGTH_TONEy ≥ 150 milliseconds
        STATEy = DELAY
        LENGTH_TONEy = 0
        Close RELAY.y            -- Isolate Caller and
        Set Flashing.x = On      -- Flash LED while sending
    END                          -- extension number to VMS
ELSE
    INCREMENT LENGTH_OFFy
    IF LENGTH_OFFy ≥ 6 seconds   -- NO VMS PLAYBACK TONE
        STATEy = ONHK            -- WAIT FOR NEXT CALL
    END
END CASE: STATEy = DELAY             -- DELAY BEFORE SENDING DIGITS INCREMENT LENGTH_TONEy
IF LENGTH_TONEy ≥ 150 milliseconds
    -- ENABLE SENDING OF STORED DIGITS --
    SET DIGITS.ReadyToDial.y = Yes
    STATEy = ONHK                -- WAIT FOR ON HOOK --
END END CASE                         -- END OF CASE (STATEy)

y = y + 1                        -- Increment line selector

ENDLOOP                          -- END OF MAIN LOOP

RETURN                           -- Return to Background Loop
```

What is claimed is:

1. A direct inward dial integration device for use in a business telephone system having a private branch exchange, a voice message system (VMS), and a plurality of direct inward dial (DID) trunk lines for connecting the PBX to telephone users external to the PBX; the VMS including means for generating a VMS playback signal when the PBX forwards a call to the VMS;
    said integration device comprising:
    monitoring means for monitoring the DID trunk lines, and for decoding and storing an extension number for each DID trunk line when a called extension number is transmitted to the PBX on said DID trunk line; and
    playback means coupled to the DID trunk lines for detecting a VMS playback signal on any one of the DID trunk lines, and for responding by transmitting to the VMS the corresponding one of said stored extension numbers.

2. A direct inward dial integration device for use in a business telephone system having a private branch exchange, a voice message system (VMS), and a plurality of direct inward dial (DID) trunk lines for connecting the PBX to telephone users external to the PBX; the VMS including means for generating a playback signal when the PBX forwards a call to the VMS; said integration device comprising:
    monitoring means for monitoring the DID trunk lines, and for decoding and storing an extension number for each trunk line when a called extension number is transmitted to the PBX on said trunk line; and
    playback means coupled to the DID trunk lines for detecting a VMS playback signal on any one of the DID trunk lines, and for responding by transmitting the corresponding one of said stored extension numbers onto the DID trunk line on which the VMS playback signal was detected.

3. The integration device set forth in claim 2 wherein:
    the DID trunk lines comprise DID trunk lines originating from a source external to the PBX, and DID connectors coupled to corresponding ports in the PBX;
    said integration device includes:
    trunk line termination means for simulating the presence of a battery reversed PBX on each DID trunk line coupled to said integration device;
    PBX termination means for simulating the presence of a DID trunk line on each PBX port corresponding to the DID trunk lines;

caller isolation means for connecting and disconnecting each DID trunk line to the corresponding DID connector, including means for responding to the detection of a playback signal on a DID trunk line by said playback means by temporarily disconnecting said DID trunk line from the corresponding DID connector, while said playback means transmits the corresponding extension number onto the DID connector; and coupling said DID trunk line to said trunk line termination means, and coupling the corresponding DID connector to said PBX termination means, while said DID trunk line and DID connector are disconnected from one another;

whereby the caller will not hear the transmission of the stored extension numbers by the integration device, and said integration device simulates the maintenance of a normal connection between the DID trunk line and the PBX even when the two are disconnected.

4. The integration device set forth in claim 2 wherein said monitoring means includes:

DTMF decoding means for decoding DTMF encoded extension numbers transmitted to the PBX on said DID trunk lines;

pulse decoding means for decoding pulse encoded extension numbers transmitted to the PBX on said DID trunk lines; and mode means for denoting whether the extension numbers transmitted to the PBX will be DTMF encoded or pulse encoded;

said pulse decoding means including means for monitoring the line voltages on each of said DID trunk lines and for determining the extension numbers sent to the PBX on said DID trunk lines when said mode means denotes that said extension numbers will be pulse encoded.

5. The integration device set forth in claim 4, wherein said pulse decoding means includes:

voltage level means for each DID trunk line for monitoring the voltage on said DID trunk line and determining, in accordance with a predefined algorithm, a first voltage level DP_OFF comprising a threshold voltage for determining when the condition of said DID trunk line corresponds to the bottom of a pulse, and a second voltage level DP_ON comprising a threshold voltage for determining when the condition of said DID trunk line corresponds to the top of a pulse; and pulse tracing means for comparing the voltage on said DID trunk line with said first and second voltage levels DP_OFF and DP_ON and thereby determining the boundaries of pulses, comparing the spacing between pulses with predetermined criteria for determining the boundaries between digits in said extension numbers, for counting the pulses in each digit in said extension numbers, and for storing the resulting digit values.

6. Apparatus for use in a business telephone system having a private branch exchange (PBX) and a plurality of direct inward dial (DID) trunk lines for connecting the PBX to telephone users external to the PBX, comprising:

a voice message system (VMS), including means for generating a playback signal when the PBX forwards a call to the VMS; and an integration device comprising:

monitoring means for monitoring the DID trunk lines, and for decoding and storing an extension number for each trunk line when a called extension number is transmitted to the PBX on said trunk line; and playback means coupled to the DID trunk lines for detecting a playback signal on any one of the DID trunk lines, and for responding by transmitting the corresponding one of said stored extension numbers onto the DID trunk line on which the playback signal was detected.

7. The apparatus set forth in claim 6, wherein said VMS includes:

storage means for storing messages, including a greeting message for a multiplicity of extension numbers and a plurality of recorded messages for each said extension number;

index means for denoting the location in said storage means means of the greeting and recorded messages for each said extension;

playback response means for detecting the extension number transmitted by said integration device, and for answering calls with the greeting message for the detected extension number, as specified by said index means.

8. The apparatus set forth in claim 6 wherein:

the DID trunk lines comprise DID trunk lines originating from a source external to the PBX, and DID connectors coupled corresponding ports in the PBX;

said integration device includes:

termination means for simulating the maintenance of a normal connection between each DID trunk line and the PBX;

caller isolation means for controllably coupling said DID trunk lines to the corresponding DID connectors, including means for responding to the detection of a playback signal on a DID trunk line by said playback means by temporarily disconnecting said DID trunk line from the corresponding DID connector, while said playback means transmits the corresponding extension number onto the DID connector; and coupling said DID trunk line and the corresponding DID connector, while the two are disconnected from one another, to said termination means;

whereby the caller will not hear the transmission of the stored extension numbers by the integration device, and said integration device simulates the maintenance of a normal connection between the DID trunk line and the PBX even when the two are disconnected.

9. A method of integrating a private branch exchange (PBX) and a voice message system (VMS), said PBX being coupled to a plurality of direct inward dial (DID) trunk lines for connecting the PBX to telephone users external to the PBX; the VMS including means for generating a playback signal when the PBX forwards a call to the VMS; the steps of the method comprising:

monitoring the DID trunk lines and decoding and storing an extension number for each DID trunk line when a called extension number is transmitted to the PBX on said trunk line; and detecting a playback signal on any one of the DID trunk lines, and for responding by transmitting the corresponding one of said stored extension numbers onto the DID trunk line on which the playback signal was detected.

10. The method set forth in claim 9 wherein:

the DID trunk lines comprise DID trunk lines originating from a source external to the PBX, and DID connectors coupled to corresponding ports in the PBX; and said method further includes the steps of:

responding to the detection of a playback signal on a DID trunk line by said playback means by temporarily disconnecting said DID trunk line from the corresponding DID connector, while said transmitting step transmits said stored extension extension number onto the DID connector; and terminating said DID trunk line and the corresponding DID connector, while said DID trunk line and DID connector are disconnected from one another, so as to simulate the maintenance of a normal connection between said DID trunk line and the PBX even when the two are disconnected;

whereby the caller will not hear the transmission of the stored extension numbers by the integration device, and the telephone call initiated by the caller will not be terminated by said temporary disconnecting step.

11. The method set forth in claim 9, including the steps of:

denoting whether the extension numbers transmitted to the PBX will be DTMF encoded or pulse encoded;

monitoring the line voltages on each of said DID trunk lines;

determining the extension numbers sent to the PBX on each DID trunk line, when said extension numbers are pulse encoded, by:

determining, in accordance with a predefined algorithm, a first voltage level DP_OFF comprising a threshold voltage for determining when the condition of the DID trunk line corresponds to the bottom of a pulse, and second voltage level DP_ON comprising a threshold voltage for determining when the condition of the DID trunk line corresponds to the top of a pulse; and comparing the voltage on the DID trunk line with said first and second voltage levels DP_OFF and DP_ON and thereby determining the boundaries of pulses, comparing the spacing between pulses with predetermined criteria and thereby determining the boundaries between digits in said extension numbers, counting the pulses in each digit in said extension numbers, and storing the resulting digit values.

* * * * *